US010063819B2

(12) United States Patent
Matsuo

(10) Patent No.: US 10,063,819 B2
(45) Date of Patent: Aug. 28, 2018

(54) PROJECTION OPTICAL SYSTEM AND PROJECTOR

(71) Applicant: NITTOH INC., Suwa-shi, Nagano (JP)

(72) Inventor: Takahiko Matsuo, Suwa (JP)

(73) Assignee: NITTOH INC., Nagano (JP)

( * ) Notice: Subject to any disclaimer, the term of this patent is extended or adjusted under 35 U.S.C. 154(b) by 0 days.

(21) Appl. No.: 15/522,120

(22) PCT Filed: Oct. 30, 2015

(86) PCT No.: PCT/JP2015/080645
§ 371 (c)(1),
(2) Date: Apr. 26, 2017

(87) PCT Pub. No.: WO2016/068269
PCT Pub. Date: May 6, 2016

(65) Prior Publication Data
US 2017/0332057 A1 Nov. 16, 2017

(30) Foreign Application Priority Data

Oct. 31, 2014 (JP) ................................. 2014-222343

(51) Int. Cl.
*H04N 9/31* (2006.01)
*G03B 21/28* (2006.01)
(Continued)

(52) U.S. Cl.
CPC ............. *H04N 9/315* (2013.01); *G02B 13/16* (2013.01); *G02B 15/20* (2013.01); *G03B 21/147* (2013.01); *G03B 21/28* (2013.01); *H04N 9/3141* (2013.01)

(58) Field of Classification Search
CPC ........ G02B 21/14; G02B 21/16; G02B 21/28; G02B 21/147; G02B 13/16; G02B 13/22; H04N 9/315; H04N 9/3105; H04N 9/3152
See application file for complete search history.

(56) References Cited

U.S. PATENT DOCUMENTS

| 6,278,553 | B1 * | 8/2001 | Akiyama | ............. | G02B 3/0087 |
| | | | | | 359/563 |
| 2002/0003656 | A1 * | 1/2002 | Kimura | .............. | G02B 17/0808 |
| | | | | | 359/366 |

(Continued)

FOREIGN PATENT DOCUMENTS

| CN | 103782222 | 5/2014 |
| EP | 2570852 | 3/2013 |

(Continued)

OTHER PUBLICATIONS

International Preliminary Report On Patentability—Application No. PCT/JP2015/080645; dated May 11, 2017, 10 pages.

(Continued)

*Primary Examiner* — Sultan Chowdhury
(74) *Attorney, Agent, or Firm* — Thompson Hine L.L.P.

(57) ABSTRACT

A projection optical system (10) projects from a first image plane (5) on a reducing side to a second image plane (6) on an enlargement side. The projection optical system (10) includes a first optical system (11) that includes a plurality of lenses and forms a first intermediate image (51) formed inside the first optical system (11) by light incident from the reducing side into a second intermediate image (52) on the enlargement side of the first optical system (11); a second optical system (12) that includes a first reflective surface (M1) with positive refractive power which is positioned further to the enlargement side than the second intermediate image (52); and a glass block (30) that is disposed between (Continued)

the first optical system (11) and the first reflective surface (M1), the glass block (30) passing light rays from the first optical system (11) to the second intermediate image (52).

20 Claims, 8 Drawing Sheets

(51) Int. Cl.
*G02B 15/20* (2006.01)
*G03B 21/14* (2006.01)
*G02B 13/16* (2006.01)

(56) References Cited

U.S. PATENT DOCUMENTS

| | | | |
|---|---|---|---|
| 2004/0156117 A1* | 8/2004 | Takaura | G02B 13/16 359/651 |
| 2009/0257117 A1 | 10/2009 | Baba | |
| 2012/0120484 A1* | 5/2012 | Konuma | G02B 13/16 359/364 |
| 2013/0010370 A1* | 1/2013 | Otani | G02B 13/12 359/668 |
| 2014/0204351 A1 | 7/2014 | Matsuo | |
| 2015/0293434 A1 | 10/2015 | Matsuo | |

FOREIGN PATENT DOCUMENTS

| | | |
|---|---|---|
| EP | 2730961 | 2/2015 |
| EP | 2835677 | 2/2015 |
| JP | 2004/258620 | 9/2004 |
| JP | 2013/033283 | 2/2013 |
| JP | 5145486 | 2/2013 |
| JP | 2014/102529 | 6/2014 |
| JP | 2014/130375 | 7/2014 |
| WO | WO 2013/005444 | 1/2013 |
| WO | WO 2014/103324 | 3/2014 |

OTHER PUBLICATIONS

International Search Report Application No. PCT/JP2015/080645; dated Jan. 26, 2016, 2 pages.

* cited by examiner

Fig. 2(a)

| TYPE | GLASS BLOCK GB | IMAGE HEIGHT Ih [mm] | LIGHT VALVE LIGHT EMITTING AREA [mm2] | AREA OF FIRST INTERMEDIATE IMAGE [mm2] | AREA OF SECOND INTERMEDIATE IMAGE [mm2] | MIRROR RADIUS Mr [mm] | MIRROR DIAMETER MR [mm] | AREA OF MIRROR [mm2] |
|---|---|---|---|---|---|---|---|---|
| (a) | GB | 17.1 | 234.1 | 248 | 364 | 35.0 | 70.0 | 1202 |
| (b) | GB | 19.8 | 275.1 | 320 | 494 | 35.0 | 70.0 | 1104 |
| (c) | NO GB | 12.1 | 118.5 | 123 | 617 | 30.85 | 61.75 | 948 |
| (d) | NO GB | 15.4 | 147.2 | 162 | 507 | 35.0 | 70.0 | 929 |

Fig. 2(b)

| TYPE | MIR1 (MIRROR DIAMETER / IMAGE HEIGHT) | MIR2 (MIRROR RADIUS / IMAGE HEIGHT) | MVR (MIRROR AREA / LIGHT EMITTING AREA) | IVR1 (AREA OF FIRST INTERMEDIATE IMAGE / LIGHT EMITTING AREA) | IVR2 (AREA OF SECOND INTERMEDIATE IMAGE / LIGHT EMITTING AREA) |
|---|---|---|---|---|---|
| (a) | 4.10 | 2.05 | 5.1 | 1.1 | 1.6 |
| (b) | 3.54 | 1.77 | 4.0 | 1.2 | 1.8 |
| (c) | 5.10 | 2.55 | 8.0 | 1.0 | 5.2 |
| (d) | 4.54 | 2.27 | 6.3 | 1.1 | 3.4 |

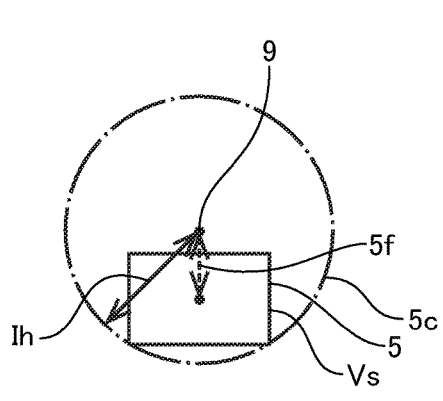

Fig.2(c)

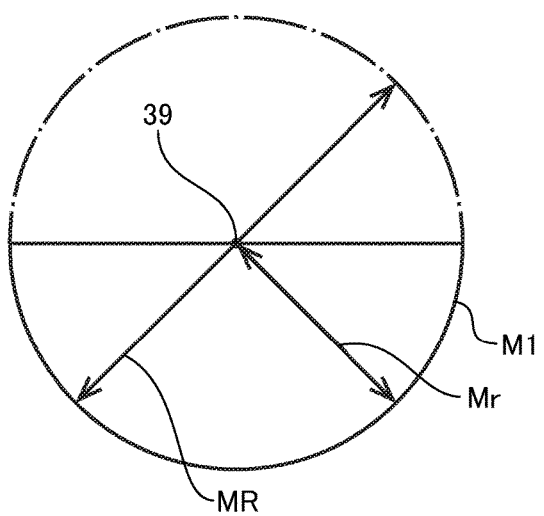

| No | RADIUS OF CURVATURE Rdy | Typ | DISTANCE Thi | EFFECTIVE DIAMETER H*2 | GLASS TYPE | REFRACTIVE INDEX nd | ABBE NUMBER vd | COMMENTS |
|---|---|---|---|---|---|---|---|---|
| 0 | Flat | OBJ | 0.00000 | | | | | FIRST IMAGE PLANE |
| 1 | Flat | SPH | 0.73000 | 60.00 | | | | |
| 2 | Flat | SPH | 95.00000 | 60.00 | BK7 | 1.516800 | 64.1664 | INPUT SIDE GB |
| 3 | Flat | SPH | 18.00000 | 60.00 | | | | |
| 4 | 126.76000 | SPH | 9.00000 | 62.10 | STIH53 | 1.846660 | 23.7775 | L1 |
| 5 | -217.59000 | SPH | 10.00000 | 61.70 | | | | |
| 6 | 55.88000 | SPH | 14.80000 | 53.50 | SFPL53 | 1.438750 | 94.9446 | L2 |
| 7 | -68.69000 | SPH | 0.69000 | 51.70 | | | | |
| 8 | -63.65000 | SPH | 2.40000 | 50.70 | TAFD25 | 1.903658 | 31.3145 | L3 |
| 9 | -195.26000 | SPH | 1.44000 | 49.70 | | | | |
| 10 | 47.11000 | SPH | 2.40000 | 44.30 | TAFD25 | 1.903658 | 31.3145 | L4 |
| 11 | 28.02000 | SPH | 2.86000 | 39.90 | | | | |
| 12 | 36.64000 | SPH | 14.00000 | 39.90 | SFPM3 | 1.537750 | 74.6875 | L5 |
| 13 | -53.79000 | SPH | 0.25000 | 38.30 | | | | |
| 14 | -55.38000 | SPH | 2.40000 | 37.50 | TAFD25 | 1.903658 | 31.3145 | L6 |
| 15 | 203.95000 | SPH | 3.31000 | 36.50 | | | | |
| 16 | 35.42000 | SPH | 12.00000 | 35.30 | SILICA | 1.458467 | 67.7954 | L7 |
| 17 | -51.76000 | SPH | 0.25000 | 33.30 | | | | |
| 18 | -75.15000 | SPH | 2.00000 | 31.60 | TAFD25 | 1.903658 | 31.3145 | L8 |
| 19 | 37.95000 | SPH | 0.85000 | 30.50 | | | | |
| 20 | 43.66000 | SPH | 11.40000 | 30.70 | STIH1 | 1.717362 | 29.5176 | L9 |
| 21 | -46.08000 | SPH | 2.93000 | 30.50 | | | | |
| 22 | -74.19000 | SPH | 3.60000 | 27.90 | SLAH55V | 1.834807 | 42.7247 | L10 |
| 23 | 51.48000 | STO | 2.62000 | 27.00 | | | | |
| 24 | 47.50000 | SPH | 5.90000 | 28.50 | STIH1 | 1.717362 | 29.5176 | L11 |
| 25 | -131.72000 | SPH | 14.47000 | 28.30 | | | | |
| 26 | Flat | SPH | 21.56000 | 25.50 | | | | STOP |
| 27 | 36.54000 | SPH | 11.40000 | 36.40 | SNBM51 | 1.613397 | 44.2670 | L12 |
| 28 | -64.09000 | SPH | 3.63000 | 35.60 | | | | |
| 29 | -30.06000 | SPH | 3.60000 | 35.20 | SLAH65V | 1.804000 | 46.5827 | L13 |
| 30 | 64.38000 | SPH | 1.37000 | 38.80 | | | | |
| 31 | 94.83000 | SPH | 17.00000 | 39.50 | SFSL5 | 1.487490 | 70.2353 | L14 |
| 32 | -25.55000 | SPH | 2.06000 | 42.00 | | | | |
| 33 | -16.85000 | *ASP | 5.00000 | 40.40 | SBAL42 | 1.583126 | 59.3738 | L15 |
| 34 | -39.67000 | *ASP | 7.35000 | 41.30 | | | | |
| 35 | 3061.66000 | SPH | 8.30000 | 39.20 | STIM1 | 1.625882 | 35.6990 | L16 |
| 36 | -38.07000 | SPH | 0.25000 | 39.50 | | | | |
| 37 | -40.51000 | SPH | 3.60000 | 39.00 | STIH53 | 1.846660 | 23.7775 | L17 |
| 38 | -345.94000 | SPH | 10.88000 | 40.20 | | | | |
| 39 | 31.27000 | *ASP | 12.10000 | 50.70 | SBAL42 | 1.583126 | 59.3738 | L21 |
| 40 | 97.91000 | *ASP | 9.42000 | 50.40 | | | | |
| 41 | 36.09000 | *ASP | 13.70000 | 49.50 | SBSL7 | 1.516330 | 64.1411 | L22 |
| 42 | -204.24000 | *ASP | 33.34000 | 47.60 | | | | |
| 43 | 109.74000 | SPH | 5.20000 | 21.80 | SFPL53 | 1.438750 | 94.9446 | L23 |
| 44 | -49.58000 | SPH | 0.25000 | 23.20 | | | | |
| 45 | 97.94000 | SPH | 1.50000 | 24.70 | TAFD25 | 1.903658 | 31.3145 | L24 |
| 46 | 37.06000 | SPH | 10.03000 | 25.20 | | | | |
| 47 | 218.52000 | SPH | 6.70000 | 36.70 | SFSL5 | 1.487490 | 70.2353 | L25 |
| 48 | -66.83000 | SPH | 0.25000 | 39.00 | | | | |
| 49 | 65.23000 | SPH | 10.70000 | 44.50 | SFPL51 | 1.496999 | 81.5447 | L26 |
| 50 | -69.95000 | SPH | 2.50000 | 45.20 | | | | |
| 51 | Flat | SPH | 75.00000 | 45.20 | SLAM60 | 1.743198 | 49.3387 | OUTPUT SIDE GB |
| 52 | Flat | SPH | 49.95000 | 44.90 | | | | |
| 53 | -29.28000 | SPS | -1163.00000 | 70.00 | | | | M1 |
| 54 | Flat | IMG | 0.00000 | | | | | SECOND IMAGE PLANE |

| No. | R | K | A3 | A4 | A6 | A8 | A10 | A12 |
|---|---|---|---|---|---|---|---|---|
| 33 | -16.850 | -3.117400 | — | -4.549400e-005 | 2.011000e-007 | -4.451800e-010 | 6.192400e-013 | -3.695300e-016 |
| 34 | -39.670 | 0.000000 | — | -1.057100e-005 | 1.624000e-008 | 3.952900e-011 | -1.226700e-013 | 1.493800e-016 |
| 39 | 31.270 | 0.077048 | — | -4.019400e-005 | 1.256000e-007 | -2.516200e-010 | 2.553900e-013 | -1.109100e-016 |
| 40 | 97.910 | 0.000000 | — | -1.108800e-005 | 1.953100e-008 | -3.225200e-011 | 3.634800e-014 | -1.748800e-017 |
| 41 | 36.090 | 0.388100 | — | 1.015900e-006 | -4.830800e-008 | 1.132300e-010 | -1.343600e-013 | 6.088500e-017 |
| 42 | -204.240 | 0.000000 | — | 2.546800e-006 | -2.012400e-008 | 5.624700e-011 | -7.553200e-014 | 4.394700e-017 |
| 53 | -29.280 | -0.961800 | 3.779500e-005 | 1.208400e-006 | -1.692000e-009 | 1.579700e-012 | -9.182900e-016 | 2.032000e-019 |

PROJECTION OPTICAL SYSTEM AND PROJECTOR

TECHNICAL FIELD

The present invention relates to a projection optical system of a projector.

BACKGROUND ART

Japanese Laid-Open Patent Publication No. 2004-258620 (hereinafter "Document 1") discloses the realization of a projection optical system which uses an image forming optical system including a reflective surface to increase the size on the screen of projected images while reducing the projection space outside a projector apparatus and which is also capable of correcting chromatic aberration, and also discloses an image projecting apparatus that uses such projection optical system. To do so, Document 1 discloses that a first and a second optical system are disposed in that order from a light valve on the projection side of the light valve, the first optical system includes at least one refractive optical system and has positive refractive power, the second optical system includes at least one reflective surface with refractive power and has positive refractive power, an image formed by the light valve is formed into an intermediate image on the optical path of the first and second optical systems, and the intermediate image is enlarged further and projected onto a screen.

DISCLOSURE OF THE INVENTION

In a variety of applications such as presentations and schools and education, there is demand for a projection optical system that is capable of achieving wider-angle projection while using a compact configuration.

One aspect of the present invention is a projection optical system that projects from a first image plane on a reducing side to a second image plane on an enlargement side. The projection optical system includes: a first optical system that includes a plurality of lenses and forms a first intermediate image formed inside the first optical system by light incident from the reducing side into a second intermediate image on the enlargement side of the first optical system; a second optical system that includes a first reflective surface with positive refractive power which is positioned further (closer) to the enlargement side than the second intermediate image; and a glass block that is disposed between the first optical system and the first reflective surface and passes rays (light rays) from the first optical system to the second intermediate image.

When inserting a glass block onto an optical path to control the optical path, with a system that uses a convex mirror, incident light to the convex mirror and outgoing light from the convex mirror will pass the glass block, resulting in interference between the incident light and the outgoing light. This means that it is difficult to insert a glass block. For systems that use a concave mirror, light flux that reaches the concave mirror on the enlargement side from a lens system spreads, and in particular, for a system that projects images with a wide angle, the width of rays that reach the concave mirror from the lens system increases, and it is difficult to insert a glass block so as to produce substantially the same effect for all light rays. On the other hand, the inventor of the present invention found that by using a first optical system that internally forms an intermediate image, it is possible to place the first intermediate image between a second intermediate image, which is formed between the first optical system and the first reflective surface, and the first image plane on the reducing side, and possible to suppress the spreading of rays that reach the first reflective surface from the first optical system. Accordingly, with the projection optical system according to the present invention, it is possible to insert a glass block that applies an effect to all rays that reach the first reflective surface from the first optical system and does not interfere with light outputted from the first reflective surface.

When projecting extremely wide-angle images onto the second image plane, the size (diameter) of the first reflective surface increases and to suppress an increase in diameter, the refractive power of the first optical system increases, making it difficult to correct various aberrations. By incorporating the first optical system that internally forms an intermediate image, it is possible to suppress the spreading of the light flux that reaches the first reflective surface from the first optical system. This means that it is possible to project extremely wide-angle images using a compact first reflective surface. In addition, by disposing a glass block that is a medium with high refractive power on an optical path that reaches the first reflective surface from the first optical system, it is possible to reduce the ray height to suppress an increase in the size of the first reflective surface without increasing the refractive power of the first optical system, in particular refractive power of the reducing side of the first optical system, which makes it possible to provide a projection optical system that is more compact.

The first optical system may be configured to internally form a plurality of intermediate images. Typically, the first optical system includes a first refractive optical system that is disposed on the reducing side and forms the first intermediate image and a second refractive optical system that is disposed on the enlargement side and forms the second intermediate image on the reducing side of the first reflective surface. The first reflective surface with positive refractive power is typically a concave mirror, and enlarges and projects the second intermediate image onto the second image plane. The first reflective surface may be rotationally symmetric or may be rotationally asymmetric.

In this projection optical system, it is possible to make the first reflective surface compact relative to the image height of the first image plane on the reducing side. An image height Ih of the first image plane and a diameter MR of the first reflective surface in this projection optical system may satisfy a following condition.

$$2.0 < MR/Ih < 4.5 \qquad (1)$$

In this projection optical system, light that has been reflected by a substantially semicircular part of the first reflective surface is projected. Accordingly, an image height Ih of the first image plane and a radius Mr of the first reflective surface may satisfy a following condition.

$$1.0 < Mr/Ih < 2.25 \qquad (2)$$

In this projection optical system, the used area of the first reflective surface is small relative to the light emitting area of the first image plane. Accordingly, a light emitting area Vs of the first image plane and an effective area Ms of the first reflective surface may satisfy a following condition.

$$1.0 < Ms/Vs < 6.0 \qquad (3)$$

In this projection optical system, it is possible to reduce the second intermediate image. Accordingly, a light emitting area Vs of the first image plane and an area I2s of the second intermediate image may satisfy a following condition.

$$1.0 < I2s/Vs < 3.0 \qquad (4)$$

In this projection optical system, it is desirable for a light emitting area Vs of the first image plane and an area I1s of the first intermediate image to satisfy a following condition. This makes it possible to provide a projection optical system with a favorable balance between performance and size.

$$0.5 < I1s/Vs < 2.0 \quad (5)$$

The glass block is disposed between the first optical system and the second intermediate image. By forming the second intermediate image outside the glass block, it is possible to prevent the influence of physical factors for the glass block, for example, scratches and dust from appearing in the second intermediate image, and possible to prevent a drop in the quality of the images that are finally projected onto the second image plane.

The glass block may include an incident surface on a first optical system side; an exit surface on a first reflective surface side; and a side surface that is between the incident surface and the exit surface, with the side surface being at least partially inclined with respect to the optical axis between the first optical system and the first reflective surface. As one example, the side surface may include a surface that is inclined so as to be substantially parallel to lower rays of the projecting light that reaches the second image plane from the first reflective surface. It is possible to suppress interference between the lower rays and the glass block. The side surface of the glass block may include an internally reflective surface that reflects rays that reach the first reflective surface from the first optical system.

It is desirable for a length GBL of the glass block along an optical axis between the first optical system and the first reflective surface and a length LML along the optical axis between the first optical system and the first reflective surface to satisfy a following condition.

$$0.1 < GBL/LML < 0.9 \quad (6)$$

It is desirable for the length GBL of the glass block along an optical axis between the first optical system and the first reflective surface, the length LML along the optical axis between the first optical system and the first reflective surface, and a refractive index GBn of the glass block to satisfy a following condition.

$$0.05 < GBL/GBn/LML < 0.7 \quad (7)$$

It is desirable for an Abbe number GBv of the glass block to satisfy a following condition.

$$30 < GBv < 100 \quad (8)$$

It is desirable for the first optical system to include a lens group G2r that has positive refractive power on the enlargement side and is separated by an aspherical lens immediately next to the first intermediate image on the enlargement side thereof, and for a focal length G2rF of the lens group G2r to satisfy a following condition.

$$0 < G2rF < 1000 \quad (9)$$

It is preferable for an optical path length OP1d of upper rays of a light flux at an image height at an outermost periphery between the first optical system and the first reflective surface and an optical path length OP2d of lower rays of that light flux to satisfy a following condition.

$$1 < OP1d/OP2d < 1.15 \quad (10)$$

Another aspect of the present invention is a projector including the projection optical system described above and a light modulator that forms an image on the first image plane. The projector may include an illumination optical system that illuminates the first image plane.

BRIEF DESCRIPTION OF THE DRAWINGS

FIG. 2(a) show various numerical values of the respective types, FIG. 2(b) shows conditions of the respective types, and FIGS. 2(c) and 2(d) show an image height and a mirror size.

FIG. 4 is a table showing lens data.

DETAIL DESCRIPTION

Figure 1A:
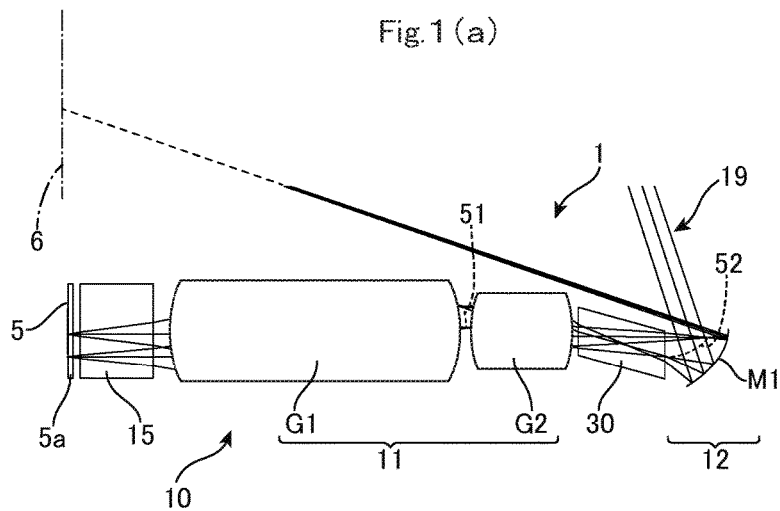
FIGS. 1(a) to 1(d) show layouts of projection optical systems of a type that includes a glass block and layouts of projection optical systems of a type that does not include a glass block.

FIGS. 1(a) to 1(d) show several examples of projectors. The projector 1 includes a projection optical system 10 or 90 that projects light from an image forming plane (first image forming plane) 5a of a light modulator (light valve) 5 on a reducing side to a screen or wall surface (second image forming plane) 6 on an enlargement side. The light valve 5 is any device capable of forming an image such as an LCD, a digital mirror device (DMD), or an organic EL display, and may be a single panel-type device or a device that uses a method where images of different colors are individually formed. The light valve 5 may be a light emitting type or may be an illuminated type. When the light valve 5 is an illuminated type, the projector 1 further includes an illumination optical system (not illustrated). The screen 6 may be a wall surface, a white board, or the like, and the projector 1 may be a front projector, or may be arear projector that incorporates a screen.

The projection optical system 10 or 90 includes a first optical system 11 including a plurality of lenses and a second optical system 12 that includes a first reflective surface M1 with positive refractive power. The reflective surface (or "first reflective surface") M1 of the second optical system 12 reflects light outputted from the first optical system 11 to project the light as projecting light 19 onto the screen 6. The first optical system 11 is a refractive optical system (lens system) that forms a first intermediate image 51, which is formed inside the first optical system 11 by light that is incident from the reducing side, into a second intermediate image 52 on the enlargement side of the first optical system 11. The first optical system 11 includes a first lens group (or "first refractive optical system") G1 disposed on the reducing side (input side) and a second lens group (or "second refractive optical system") G2 disposed on the enlargement side (output side) on the opposite side of the first intermediate image 51 to the first lens group G1. The second lens group G2 forms the first intermediate image 51 into the second intermediate image 52 on the reducing side of the first reflective surface (or "mirror") M1. The mirror M1 enlarges and projects the second intermediate image 52 onto the screen 6.

Figure 1B:
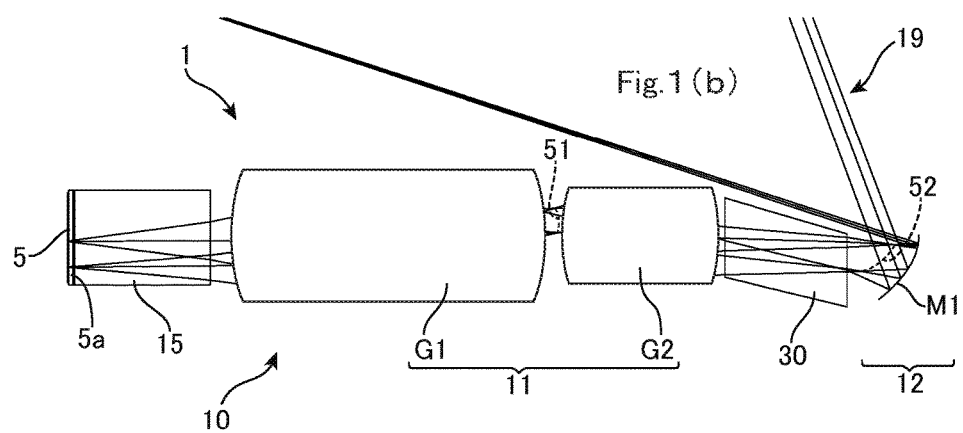
Figure 1C:
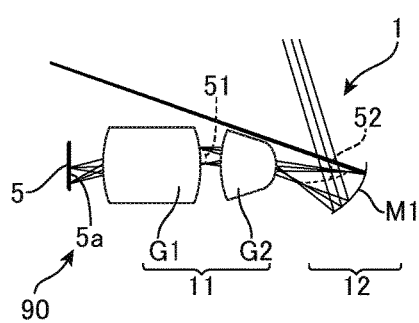
Figure 1D:
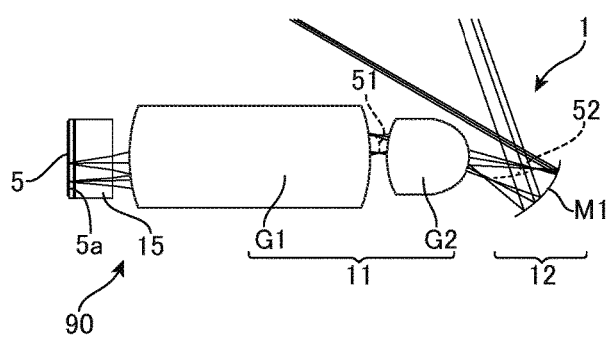

The projection optical system 10 of the projector 1 depicted in FIGS. 1(a) and 1(b) further includes a glass block (or "GB" or "prism") 30 disposed between the first optical system 11 and the first reflective surface (mirror) M1. Rays (light rays) that reach the second intermediate image 52 from the first optical system 11 pass through the glass block 30.

The optical systems 10 and 90 shown in FIGS. 1(a) to 1(d) are optical systems that form a plurality of intermediate images. That is, the projection optical systems 10 and 90 include a combination of the mirror M1 and the first optical system 11 (typically a refractive optical system), which internally forms the first intermediate image 51 and forms the second intermediate image 52 for projection purposes in front of the mirror M1. The main advantage of these projection optical systems 10 and 90 is that it is possible to greatly miniaturize the aspherical mirror M1 compared to an optical system that forms only one intermediate image, like that described in Document 1.

In addition, with the projection optical system 10 shown in FIGS. 1(a) and 1(b), the glass block 30 is inserted between the second lens group G2 and the mirror M1. Firstly, by using a first optical system 11 that internally forms the intermediate image 51, it is possible to form the intermediate image 51 upstream of the second intermediate image 52 at a position that is closer to the image on the light valve 5 than the intermediate image (or "second intermediate image") 52 formed between the first optical system 11 and the mirror M1. Accordingly, it is possible to suppress the spread of light rays that reach the mirror M1 from the first optical system 11, which internally includes the intermediate image 51, via the second intermediate image 52 that is positioned upstream of the mirror M1. This means that it is possible to insert the glass block 30, which passes all of the rays (light flux) that reach the mirror M1 from the first optical system 11, between the second lens group G2 and the mirror M1. By doing so, the dimensions of the mirror M1 can be further miniaturized compared to the optical systems 90 shown in FIGS. 1(c) and 1(d) that do not include such glass block.

FIG. 2(a) provides various numerical values for the optical systems shown in FIGS. 1(a) to 1(d) (hereinafter referred to as "Type a", "Type b", "Type c", and "Type d"). As shown in FIG. 2(c), the image height Ih is the image height of the light valve 5 and corresponds to the radius of an image circle 5c. The light valve 5 that is the first image plane is set at a position that is shifted by an offset 5f from a lens optical axis 9 of the refractive optical system 11, and a disc produced by circumscribing the ends of the light valve 5 that are furthest from the lens optical axis 9 is set as the image circle 5c. The light emitting area (size) Vs is the area for light emitting on the light valve 5, and the size (horizontal dimension, vertical dimension, and offset (mm)) of the light valve 5 in the various optical systems is (19.35, 12.10, 8.00) for type a, (19.15, 14.36, 10.14) for type b, (14.52, 8.16, 5.60) for type c, and (14.01, 10.51, 8.48) for type d.

The first intermediate image area I1s (the area or size of the first intermediate image 51) and the second intermediate image area I2s (the area or size of the second intermediate image 52) are (projected) areas (in $mm^2$) when the light emitting area (size) Vs is formed into the first intermediate image 51 and the second intermediate image 52 when looking from a plane that is perpendicular to the respective optical axes. As depicted in FIG. 2(d), the mirror radius Mr and diameter MR are the radius and diameter of a circle when projected onto a plane that is perpendicular to the optical axis 39, and for the various optical systems of the respective types depicted in FIG. 1, in reality only the part of the mirror M1 that is below the optical axis 39 is used as depicted in FIG. 2(d). The mirror M1 that actually set may be larger than the dimensions described above, and in reality the numerical values given in FIG. 2(a) indicate the radius and diameter of a circle (effective circle) circumscribed at a point of incident area (i.e., the area where light from the light valve 5 is incident) that is furthest from the optical axis 39. The mirror area (effective area, size) Ms is given when an area of the mirror M1 where light (ray, light flux) projected from the light emitting area Vs of the light valve 5 is incident is projected onto a plane that is perpendicular to the optical axis 39.

For projection optical systems that use a mirror, there is a general tendency where the mirror size (effective diameter) MR increases as the image circle increases. For the optical systems (type c and type d) shown in FIGS. 1(c) and 1(d) that do not include a glass block, the image height Ir and the mirror size MR are correlated. On the other hand, for the optical systems (type a and type b) shown in FIGS. 1(a) and 1(b) that include a glass block GB, it can be understood that the image height Ir is larger than type d in spite of the mirror size MR being the same as type d, so that the image height can be increased without further increasing the mirror size MR.

Accordingly, it is possible, while maintaining the mirror size MR thanks to effect of the glass block 30, to provide the projector 1 that is capable of increasing the image height and projecting large images with a more compact configuration. The effect of the glass block 30 can be expressed by the ratio MIR1 between the mirror size (the effective diameter (diameter) of the mirror M1 in mm) MR and the image height Ir, which can be set in a range where condition (1) below is satisfied.

$MIR1$=mirror size (diameter) $MR$/image height $Ih$ $$2.0<MIR1<4.5 \qquad (1)$$

In the optical system 90 that forms multiple intermediate images, MIR1 is 5.5 or below and preferably 5.1 or below. With the projection optical system 10 that includes the glass block 30 however, it is possible to further reduce MIR1. For the optical system 10 that includes the glass block 30, MIR1 is preferably 4.4 or below, more preferably 4.2 or below, and even more preferably 4.1 or below. To favorably correct aberrations of the refractive optical system (first optical system) 11, the lower limit is around 2.0.

As one example, it is also possible to express the effect of the glass block 30 with a ratio MIR2 between the effective radius Mr (in mm) of the mirror M1 and image height Ir, which can be set in a range that satisfies the following condition (2).

$MIR2$=mirror size (radius) $Mr$/Image height $Ih$ $$1.0<MIR2<2.25 \qquad (2)$$

In the same way as described above, MIR2 should preferably be 2.2 or below, more preferably 2.1 or below, and even more preferably 2.05 or below. To favorably correct aberrations of the refractive optical system 11, the lower limit is around 1.0.

The effect of the glass block 30 can be expressed using the light emitting area Vs of the first image plane, that is, the light valve 5, and the effective area Ms of the mirror M1 that is the first reflective surface, and can be set in a range that satisfies the following condition.

MVR=mirror area Ms/light emitting area Vs $$1.0 < MVR < 6.0 \quad (3)$$

MVR should preferably be 5.8 or below, more preferably 5.6 or below, and even more preferably 5.5 or below. To favorably correct aberrations of the refractive optical system 11, the lower limit is around 1.0.

The effect of the glass block 30 can also be expressed using the light emitting area Vs of the first image plane, that is, the light valve 5 and the area I2s of the second intermediate image 52, and can be set in a range that satisfies the following condition.

IVR2=area I2s of intermediate image/light emitting area Vs $$1.0 < IVR2 < 3.0 \quad (4)$$

IVR2 should preferably be 2.8 or below, more preferably 2.6 or below, and even more preferably 2.5 or below. To favorably correct aberrations of the refractive optical system 11, the lower limit is around 1.0.

When considering that the optical system 1 is a magnifying projection optical system, it is preferable for the image heights to gradually increase in the order of the image on the light valve 5, the intermediate image (or "in-lens intermediate image") inside the refractive optical system 11, and the intermediate image (or "in-air image") in air in the space between the refractive optical system 11 and the mirror M1. That is, it is preferable for the light emitting area Vs, the area Is1 of the first intermediate image 51, and the area Is2 of the second intermediate image 52 to satisfy the following condition.

$$Vs < I1s < I2s \quad (4.5)$$

On the other hand, as the in-lens intermediate image becomes larger, the size of the mirror M1 also relatively increases. If the size or area of the mirror M1 is decreased (miniaturized) in a state where the in-lens intermediate image is large, it becomes necessary to increase the refractive power of the refractive optical system 11, which is disadvantageous for correcting aberration. If the magnification of the in-lens intermediate image falls far below equal magnification, this is also disadvantageous for correcting aberration when projecting as an enlarged image. If the magnification of the in-lens intermediate image greatly exceeds equal magnification, this leads to an increase in the size of the mirror M1, and if the mirror M1 is excessively miniaturized, it becomes necessary to increase the refractive power of the refractive optical system 11, which is disadvantageous for correcting aberration. From these relationships, it is preferable for the ratio between the image on the light valve 5 (the light emitting area Vs) and the intermediate image (the area I1s of the first intermediate image 51) to converge to the range given in the following condition.

IVR1=first intermediate image area I1s/light emitting area Vs $$0.5 < IVR1 < 2.0 \quad (5)$$

This condition is valid for every optical system that forms an intermediate image inside the refractive optical system 11, including the types a to d, irrespective of whether a glass block GB is included. The upper limit is preferably 1.8 or below and more preferably 1.6 or below. The lower limit is preferably 0.6 or above and more preferably 0.7 or above.

Figure 3:
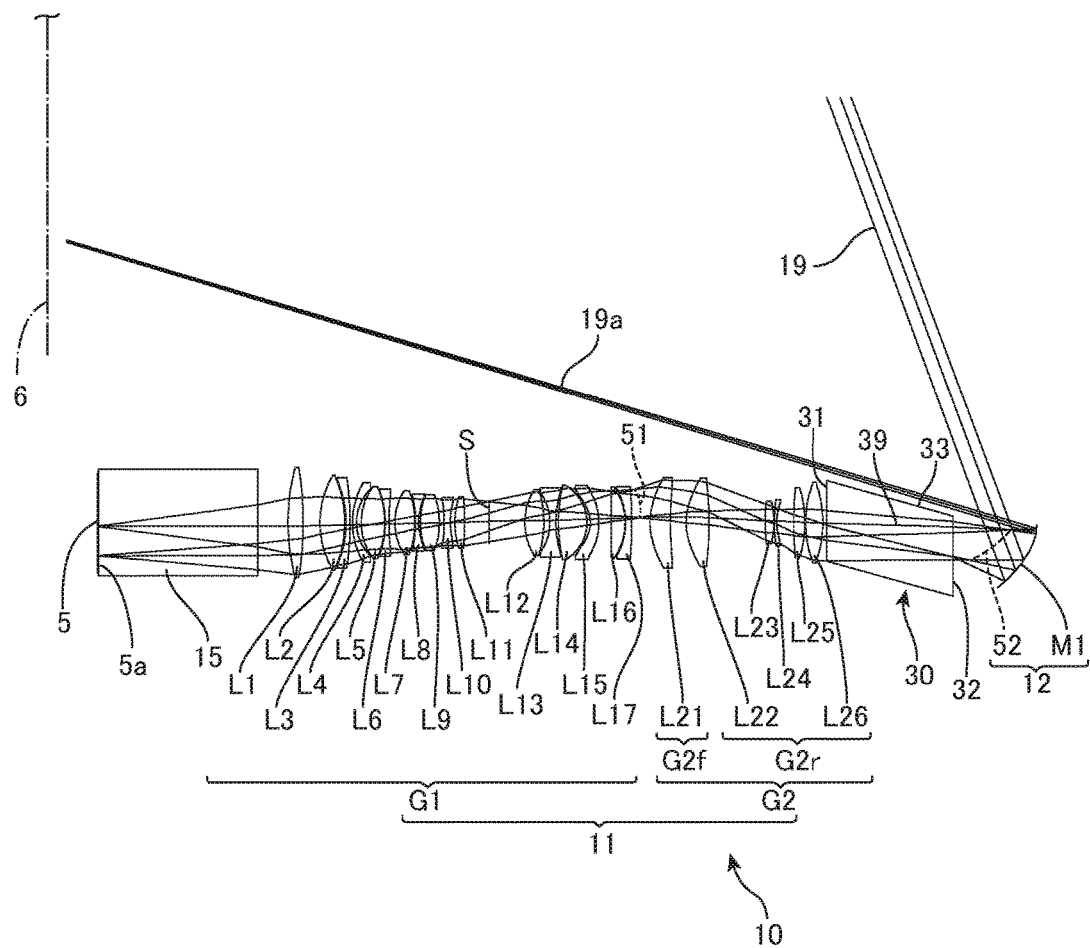
FIG. 3 shows an example of a projection optical system including a glass block.
Figures 5, 6:
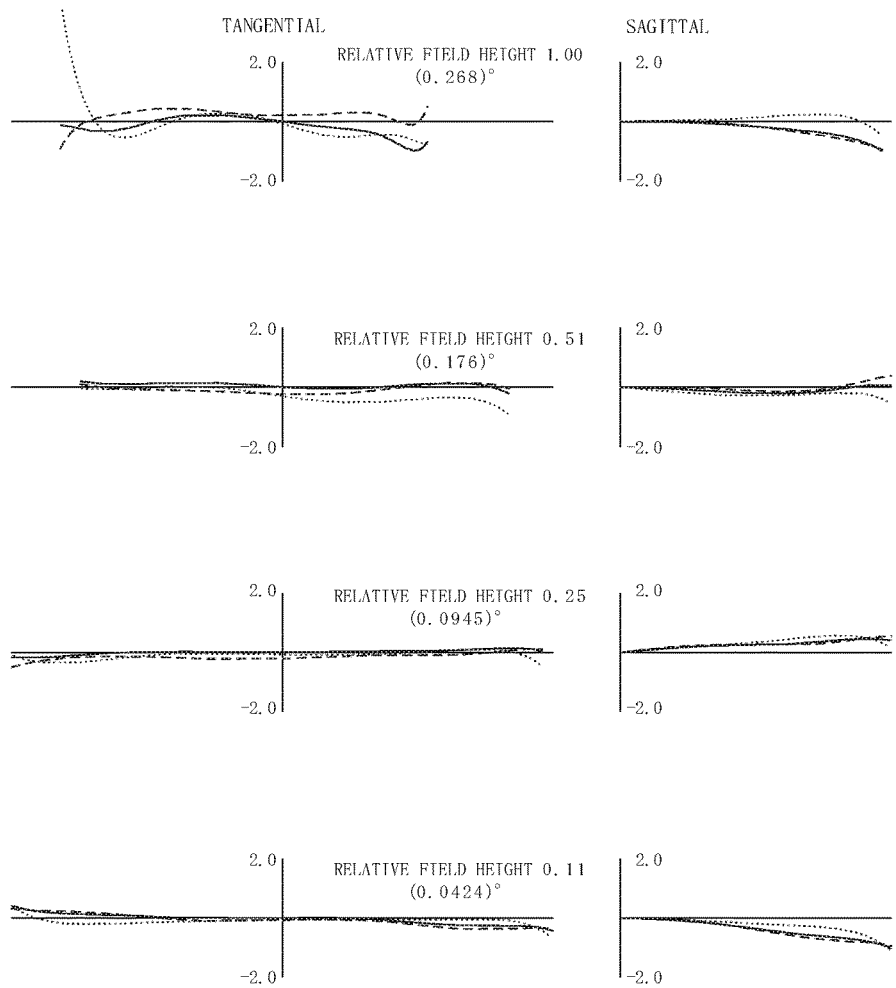
FIG. 5 is a table showing data on aspherical surfaces.
FIG. 6 shows aberrations.

FIG. 3 shows a more specific example of the projection optical system 10 that includes the glass block 30. FIG. 4 provides data on the respective elements of the projection optical system 10. FIG. 5 provides data on aspherical surfaces out of the various elements. The projection optical system 10 is a specific example of type b described earlier. Accordingly, the various numerical values and conditions of type b given in FIGS. 2(a) and 2(b) are satisfied.

In FIG. 4, "Rdy" is the radius of curvature (in mm) of the respective elements (each lens surface in the case of a lens) disposed in order from the reducing side, a curved surface type is shown for each element as "SPH" for spherical and "ASP" for aspherical, "Thi" is the distance (in mm) between surfaces of the respective elements disposed in order from the reducing side, "H*2" is the effective diameters (in mm) of each element, and, for each element made of glass, the glass type, refractive index (d line), and Abbe number (d line) are given.

The aspherical surfaces are expressed by the following equation using the coefficients R, K, A3, A4, A6, A8, A10, and A12 shown in FIG. 5 with X as the coordinate in the optical axis direction, Y as the coordinate in a direction perpendicular to the optical axis, the direction in which light propagates as positive, and R as the paraxial radius of curvature. Note that "En" represents "10 to the power n".

$$X=(1/R)Y^2/[1+\{1-(1+K)(1/R)^2Y^2\}1/2]+A3Y^3+A4Y^4+A6Y^6+A8Y^8+A10Y^{10}A12Y^{12}$$

FIG. 6 is a lateral aberration graph for each image height. As depicted in FIG. 6, coma aberration is favorably corrected, making it possible to project sharp images onto the screen 6. Note that coma aberration is depicted for the wavelength 620 nm (dashed line), the wavelength 546 nm (solid line), and the wavelength 450 nm (dotted line), and aberration is separately depicted for both tangential rays (T) and sagittal rays (S).

In order from the reducing side, the projection optical system 10 includes an incident-side glass block 15, the first optical system (or "refractive optical system" or "lens system") 11 that includes the first lens group G1 and the second lens group G2, the output-side glass block 30, and the second optical system (or "reflective optical system" or "mirror system") 12 that includes the mirror M1. The first lens group G1 forms the first intermediate image 51 on the enlargement side using light incident from the first image plane 5a on the reducing side. The first lens group G1 includes seventeen lenses numbered L1 to L17, with a stop S being disposed between the lens L11 and the lens L12. The second lens group G2 forms the first intermediate image 51 on the reducing side into the second intermediate image 52 on the enlargement side. The second lens group G2 includes six lenses numbered L21 to L26, and includes a former group G2f, which consists of a convex meniscus lens L21 that faces the first intermediate image 51, has positive refractive power, and is aspherical, and a latter group G2r which consists of the remaining five lenses L22 to L26. The respective types of the lenses L11 to L17 and L21 to L26 areas indicated by the lens data given in FIG. 4.

If the mirror M1 is miniaturized or downsized without the output-side glass block 30 being provided, it becomes necessary to increase the refractive power of the first lens group G1. Increasing the refractive power of the first lens group G1 has the risk of an increase in coma aberration and a drop in resolution performance at the image periphery. By introducing the glass block 30 on the output side of the first optical system 11, it is possible to reduce the height of the rays that pass through the glass block 30 toward the mirror M1. By doing so, it is possible to downsize the mirror M1 without increasing the power of the first lens group G1. By appropriately selecting the thickness of the glass block 30 (i.e., the length along the optical axis 39), it is possible to conversely reduce the refractive power of the first lens group G1 and thereby promote an improvement in resolution. This means that it is possible to project images where various aberrations have been favorably corrected on the screen 6 as depicted in FIG. 6.

This effect increases the higher the proportion of the distance between the refractive optical system 11 and the mirror M1 occupied by the glass block 30. Accordingly, it is desirable for the ratio between the length GBL of the glass block 30 along the optical axis 39 between the first optical system 11 and the mirror (first reflective surface) M1 and the length LML along the optical axis 39 between the first optical system 11 and the mirror M1 to be in the range in condition (6) below. For the projection optical system 10 shown in FIG. 3, this ratio is 0.59 (75/127.45).

$$0.1 < GBL/LML < 0.9 \qquad (6)$$

It is preferable for the lower limit of the condition (6) to be 0.40, and more preferably 0.50.

The refractive index GBn of the glass block 30 complements the effect described above of the glass block 30. Accordingly, it is desirable for the refractive index GBn to be as high. However, glass with a high refractive index has a low Abbe number so that there is deterioration in the transmittance of blue light. For this reason, it is preferable for the refractive index GBn of the glass block 30 and other variables to be in the range of condition (7) below. For the projection optical system 10 depicted in FIG. 3, the value of the equation (7) (the optical path equivalent size) is 0.34 (75/1.743198/124.95).

$$0.05 < GBL/GBn/LML < 0.7 \qquad (7)$$

The lower limit of equation (7) should preferably be 0.15, and more preferably 0.25. The upper limit should preferably be 0.6, and more preferably 0.5. If this value is too high, the thickness of the glass block 30 becomes excessively large, resulting in an increased risk of interference with rays (i.e., rays that have been reflected by the mirror M1). Also, when the refractive index GBn is too low, the effect of miniaturizing the mirror M1 is reduced.

When considering the transmittance of blue light and cost, the Abbe number GBv of the glass block 30 should preferably satisfy condition (8) below. With the projection optical system depicted in FIG. 3, the Abbe number GBv is 49.3.

$$30 < GBv < 100 \qquad (8)$$

The lower limit of the condition (8) should preferably be 40, and more preferably 50. When cost is taken into consideration, the upper limit should preferably be 75 and more preferably 65.

It is also preferable for the focal length G2rF of the latter group G2r of the second lens group G2 to satisfy condition (9) below. The latter group G2r as a whole has positive refractive power, and the focal length of the latter group G2r affects the position of the second intermediate image and in turn also affects the size of the mirror M1. For the projection optical system depicted in FIG. 3, the focal length G2rF is 111.0 mm.

$$0 < G2rF < 1000 \text{ (mm)} \qquad (9)$$

To miniaturize the mirror M1, the upper limit should preferably be 500, and more preferably 200.

If the focal length of the latter group G2r, which is the optical system on the mirror M1 side of the first intermediate image 51 but does not include the aspherical lens L21 that is closest to the first intermediate image 51 and has positive refractive power, is increased to reduce the refractive power, this is helpful in correcting coma aberration. Reducing the refractive power also makes it possible to provide sufficient distance for introducing the glass block 30. Accordingly, the lower limit of condition (9) should preferably be 31, more preferably 40, and even more preferably 50.

Also, to introduce the glass block 30 between the first optical system 11 and the mirror M1, it is important for the combined focal length GwrF of the part (referred to as the "latter group G2r") that is the optical system on the mirror M1 side of the first intermediate image 51 but does not include the aspherical lens L21 that is closest to the first intermediate image 51 and has positive refractive power to be positive.

Figure 7:
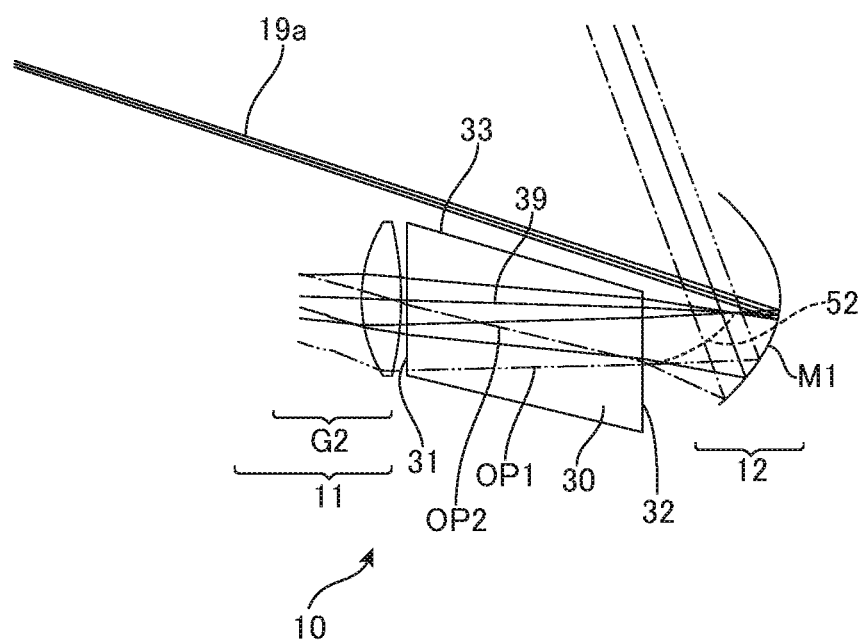
FIG. 7 is an enlarged diagram about a glass block.

FIG. 7 shows an overview of rays that pass through the glass block 30. The light flux of the widest image angle, especially the lower ray OP2 of the widest image angle passes the outermost periphery of the mirror M1. Accordingly, this is one of the most important parameters in deciding the size of the mirror M1. The mirror M1 is an aspherical mirror whose form is substantially decided by the angle of view to be obtained. For the light flux at the image height close to the periphery, there is a large difference in angle of reflection on the surface of the mirror M1 at an upper ray OP1 and a lower ray OP2 of the light flux. Due to this, high levels of astigmatism and coma aberration are likely to occur. Differences in the optical path between the lens (first optical system) 11 and the mirror M1 have a large role in correcting such aberrations. It is desirable to set a long length for the optical path of the lower ray OP2 with respect to the rays (projecting light) 19 after reflection by the mirror M1. This means that there may be a variety of optimal sizes of the mirror M1 for an arbitrary optical specification. Accordingly, when producing a design where the mirror M1 is smaller than the optimal mirror size, it becomes no longer possible to sufficiently achieve a difference in optical paths between the upper ray and lower ray after reflection by the mirror.

By inserting the glass block 30, due to the effect of the refractive index, an effect is obtained whereby the difference in optical paths described above is corrected. By doing so, it is possible to achieve sufficient performance even when the mirror size is reduced. The optical path length OP1d of the upper ray OP1 of the light flux at the image height at the outermost periphery and optical path length OP2d of the lower ray OP2 of that light flux between the first optical system 11 and the mirror (first reflective surface) M1 should preferably satisfy the following condition. For the projection optical system 10 shown in FIG. 3, this value is 1.04 (178.2/171.56)

$$1 < OP1d/OP2d < 1.15 \qquad (10)$$

The upper limit should preferably be 1.10 and more preferably 1.05.

From the condition (6), there is an effect whereby a long glass block 30 makes it easier to make the mirror M1 compact. On the other hand, when the glass block 30 approaches the mirror M1, there is a risk of the exit surface 32 of the glass block 30 and the second intermediate image 52 overlapping. If the exit surface (emitting surface) 32 crosses the second intermediate image 52, there is the risk of adhering dust and scratches on the exit surface 32 appearing in the projected images. When the projection optical system 10 is used as the projector 1, there is also the risk of dust being burnt onto the exit surface 32 by high-intensity light. Accordingly, one method of avoiding this problem is to use a construction where the second intermediate image 52 does not cross the exit surface 32 of the glass block 30.

On the other hand, at the second intermediate image 52, at image angles near the image height at the outermost periphery, the image forming state is not controlled especially favorably. In addition, at the image height at the outmost periphery, the second intermediate image 52 is inclined toward the reducing side so as to approach the glass block 30. This means that the spot size of the part of the second intermediate image 52 formed near the glass block 30 is large, and if only the light flux for the image height at the outermost periphery crosses the exit surface 32 of the glass block 30, the influence on the quality of images projected onto the screen 5 will be small. Downsizing (miniaturization) of the mirror M1 is also facilitated.

Accordingly, to satisfy demands for both mirror size and image quality, it is preferable for the image forming points of up to 50% of the maximum image height of the image plane of the second intermediate image 52 to not cross the exit surface 32. When image quality is given priority, it is preferable for the image forming points of up to 75% of the maximum image height to not cross the exit surface 32, and more preferable for image forming points of up to 90% of the maximum image height to not cross the exit surface 32.

Also, as shown in FIG. 7, to avoid interference with the rays reflected from the mirror M1, in particular with the lower rays 19a of the projecting image, an upper surface 33 of the glass block 30 should preferably be substantially parallel with the lower rays 19a. For a typical glass block 30, the incident surface 31 on the reducing side and the exit surface 32 are parallel with each other and perpendicular to the optical axis 39, and the side surfaces that join or connect these surfaces, and in particular a side surface 33 on the projection side is inclined with respect to the optical axis 39. Although the entire side surface 33 is inclined in this example, it is also possible for only part of the side surface 33 to be inclined.

When considering the lower rays 19a on the projection side and the first intermediate image 51 and the second intermediate image 52 are formed on opposite sides of the optical axis 39, it is preferable to shift the exit surface 32 with respect to the incident surface 31 toward the opposite side to the projection side of the optical axis 39. The glass block 30 may be a cylinder or a rectangular solid that has been deformed in parallel. For the projection optical system 10, to cause all of the light flux that reaches the mirror M1 from the first optical system 11 to converge, the glass block 30 may be a pyramid or a conical shape that narrows on the enlargement side.

Figure 8:
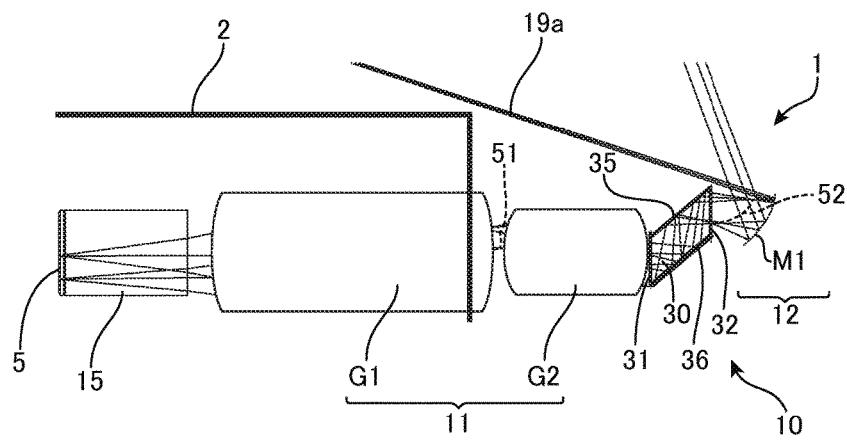
FIG. 8 shows a different example of a projection optical system.

FIG. 8 shows a projection optical system 10 that includes a different glass block 30 and a projector 1 that includes this projection optical system 10. In this projection optical system 10, by providing two reflective surfaces 35 and 36 on the inside (side surfaces) of the glass block 30, it is possible to change the projection direction and/or to achieve an offset between the mirror M1 and the rays 19, for example, the lower rays 19a.

FIG. 9 shows one example where the projection optical system 10 shown in FIG. 3 is housed in a housing (body) 2. When the projection optical system 10 is used in the projector 1, it is necessary to avoid interference between the lower rays 19a that have been reflected by the mirror M1 and both the projection optical system 10 itself and the body 2 of the projector 1.

For an optical system without a glass block, to increase the height of the lower rays 19a, it is possible to increase the off-axis distance of the light valve 5. With this method, since it is necessary to increase the off-axis distance more than necessary, there is the problem that the distance (positional relationship) between the projector and the projected images at the screen becomes larger. The image circle also becomes larger, which is disadvantageous from the viewpoints of optical design performance and mirror size.

Figure 9A:
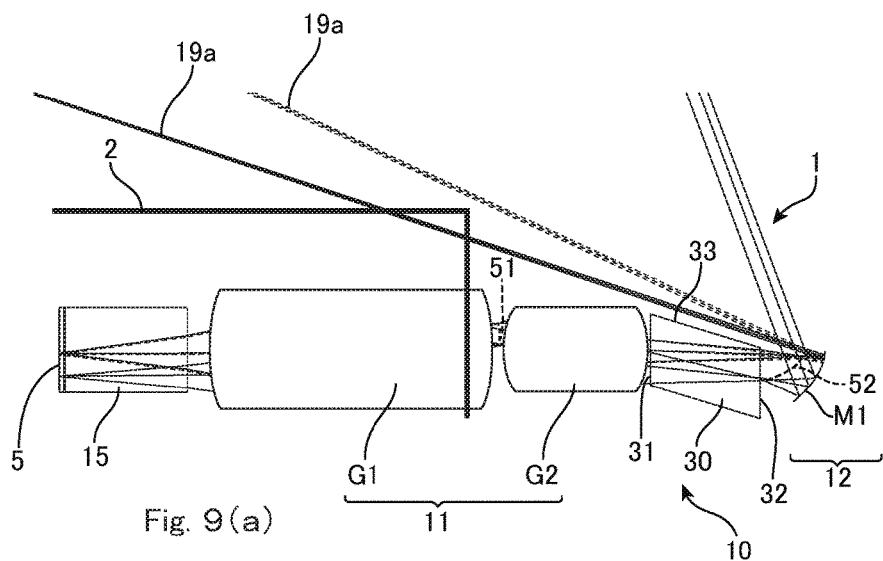
FIGS. 9(a) and 9(b) show diagrams illustrating interference with the body of a projector.
Figure 9B:
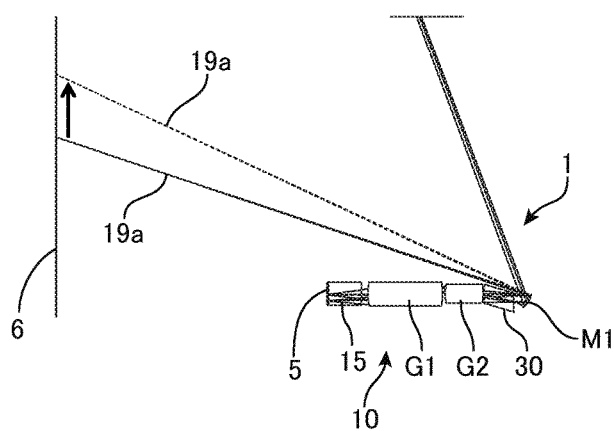

As shown in FIG. 9(a), by inserting the glass block 30, it is possible to solve the problem of needing to provide clearance between the mirror M1 and the body 2. However, if there is interference with the body as depicted in FIG. 9(a), it becomes necessary to raise the lower rays 19a to avoid interference with the body 2 as depicted in FIG. 9(b) and control the height at which images can be projected onto the screen 6.

For a configuration with the glass block 30, as depicted in FIG. 8, by providing the reflective surfaces 35 and 36 inside the glass block 30, it is possible to raise the lower rays 19a and to avoid interference for the rays without increasing the off-axis distance of the light valve 5. When the glass block 30 is also used as a prism, it is desirable for the reflective surfaces 35 and 36 that face one another to be substantially parallel. Also, if the angle of inclination is increased beyond 45 degrees while maintaining the relationship that the reflective surfaces 35 and 36 are substantially parallel, the angle of the rays that are incident on the reflective surfaces 35 and 37 will exceed the angle for total internal reflection. If total reflection occurs for all of the rays incident on the reflective surfaces 35 and 36, it is unnecessary to provide a reflective film on the reflective surfaces 35 and 36, which makes it possible to reduce cost. Accordingly, it is desirable for the angles made by the reflective surfaces 35 and 36 of the glass block 30, which are substantially parallel, with respect to the incident surface 31 to exceed 45 degrees.

Figure 10:
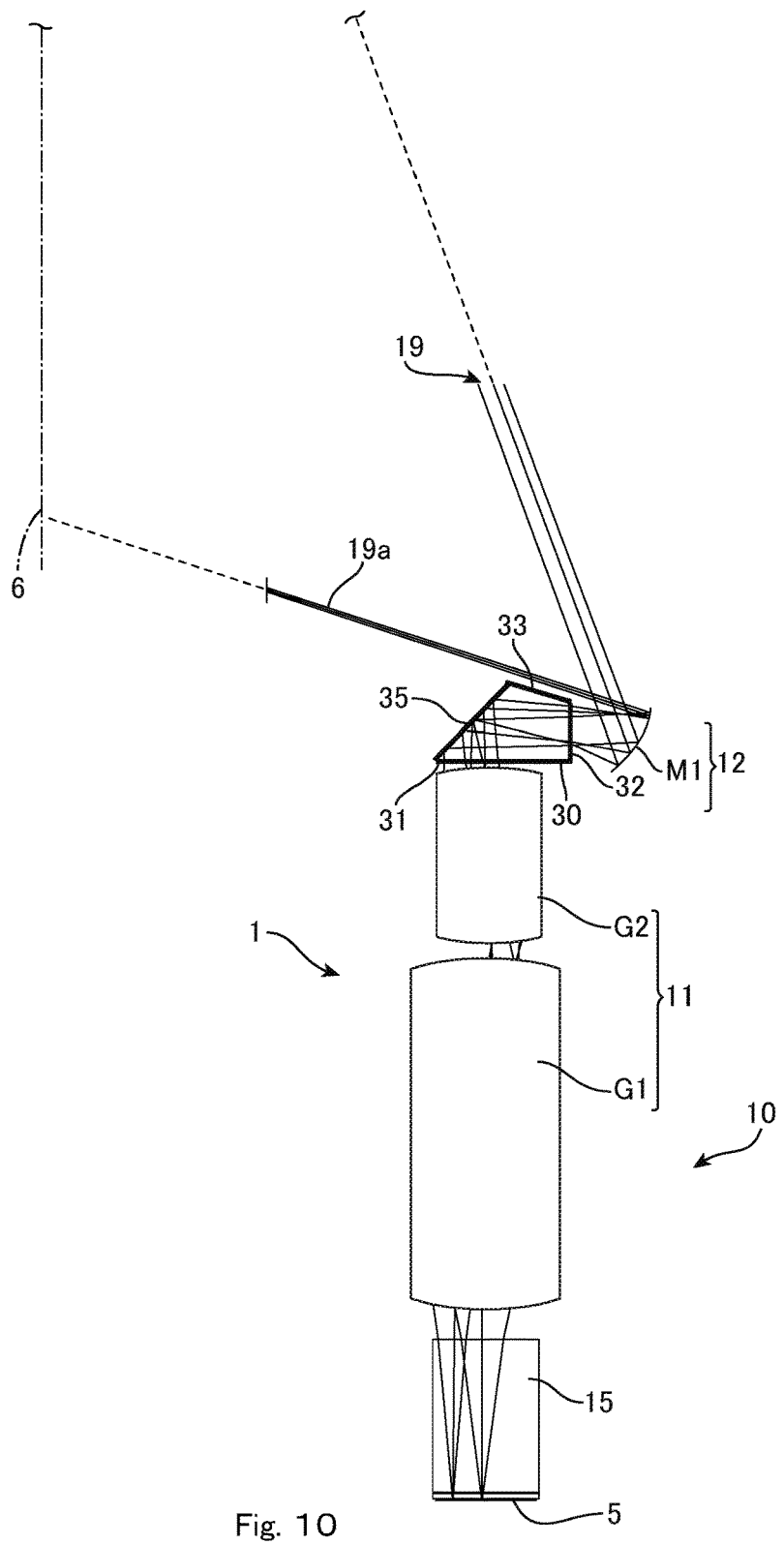
FIG. 10 shows a different projection optical system.

FIG. 10 shows a projection optical system 10 that includes yet another glass block 30 and a projector 1 that includes this projection optical system 10. This projector 1 can be placed vertically, and as one example it is possible to prop up the projector 1 against a wall surface that is the screen 6 and to project large images that extend above the projector 1. The glass block 30 internally includes a 45-degree reflective surface 35, the incident surface 31 and the exit surface 32 are not parallel, and a projection-side surface 33 adjacent to the exit surface 32 is inclined with respect to the optical axis so as to be substantially parallel to the lower rays 19a. To avoid interference, the surface 33 that faces the optical axis should preferably be substantially parallel to the lower rays 19a. By providing the 45-degree reflective surface 35 in this way in the glass block (prism) 30, it is possible to achieve both the effect whereby it is possible to downsize the mirror M1 due to the glass block 30 and an effect whereby it is possible to change the projection direction.

When the glass block (prism) 30 has one reflective surface, it is necessary for the angle to be set at 45 degrees. When there are two reflective surfaces, the optical performance is compensated by setting the two surfaces at the same angle. As one example, it is possible to adjust the optical path by providing two 50-degree reflective surfaces. With this angle, rays that are incident on the optical path of blue light will exceed the critical angle for total internal reflection at the inclined surfaces, which means that high reflectance can be achieved without coating the inclined surfaces.

The reflective surface 35 may be formed using a reflective film made of metal. On the other hand, if rays are concentrated, it is possible for temperature drift to occur due to the heat produced due to light absorption by the metal. The 45-degree surface 35 may use a dielectric multi-layer film. It is also possible to form the reflective surface 35 from a composite film or layer including metal and a dielectric multi-layer film. If there are no design limitations, the reflective surface 35 may be a surface that achieves total internal reflection.

That is, when the prism 30 includes two inclined surfaces used as reflective surfaces, it is desirable for the angles of the inclined surfaces to be substantially parallel, to be inclined by more than 45 degrees, and to be such that total internal reflection of all of the light flux emitted from the light valve 5 is achieved at the inclined surfaces. When the prism 30 includes one inclined surface used as a reflective surface, the film used on the inclined surface may be a reflective metal film provided with a dielectric multi-layer film or the film used on the inclined surface may be a dielectric multi-layer reflective film.

One or both of the incident surface 31 and the exit surface 32 of the glass block 30 may be a surface that has refractive power. Also, the glass block 30 may be constructed of a composite or cemented body of glass with a plurality of refractive powers and/or Abbe numbers. The glass block 30 may be constructed of a cemented body of glass with a plurality of refractive powers and/or Abbe numbers and the cementing or bonding surfaces may be provided with refractive power.

The invention claimed is:

1. A projection optical system that projects from a first image plane on a reducing side to a second image plane on an enlargement side, comprising:
    a first optical system that includes a plurality of lenses and forms a first intermediate image formed inside the first optical system by light incident from the reducing side into a second intermediate image on the enlargement side of the first optical system;
    a second optical system that includes a first reflective surface with positive refractive power which is positioned further to the enlargement side than the second intermediate image; and
    a glass block that is disposed between the first optical system and the first reflective surface, the glass block passing rays from the first optical system to the second intermediate image;
    wherein an image height Ih of the first image plane and a diameter MR of the first reflective surface satisfy a following condition $2.0 < MR/Ih < 4.5$.

2. The projection optical system according to claim 1, wherein the image height Ih of the first image plane and a radius Mr of the first reflective surface satisfy a following condition $1.0 < Mr/Ih < 2.25$.

3. The projection optical system according to claim 1, wherein a light emitting area Vs of the first image plane and an effective area Ms of the first reflective surface satisfy a following condition $1.0 < Ms/Vs < 6.0$.

4. The projection optical system according to claim 1, wherein the first optical system includes a lens group G2r that has positive refractive power on an enlargement side and is separated by an aspherical lens immediately next to the first intermediate image on an enlargement side thereof, and a focal length G2rF of the lens group G2r satisfies a following condition $0 < G2rF < 1000$.

5. A projector comprising:
    the projection optical system according to claim 1, and
    a light modulator that forms an image on the first image plane.

6. A projection optical system that projects from a first image plane on a reducing side to a second image plane on an enlargement side, comprising:
    a first optical system that includes a plurality of lenses and forms a first intermediate image formed inside the first optical system by light incident from the reducing side into a second intermediate image on the enlargement side of the first optical system;
    a second optical system that includes a first reflective surface with positive refractive power which is positioned further to the enlargement side than the second intermediate image; and
    a glass block that is disposed between the first optical system and the first reflective surface, the glass block passing rays from the first optical system to the second intermediate image;
    wherein a light emitting area Vs of the first image plane and an area I2s of the second intermediate image satisfy a following condition $1.0 < I2s/Vs < 3.0$.

7. The projection optical system according to claim 6, wherein the light emitting area Vs of the first image plane and an area I1s of the first intermediate image satisfy a following condition $0.5 < I1s/Vs < 2.0$.

8. A projector comprising:
    the projection optical system according to claim 6, and
    a light modulator that forms an image on the first image plane.

9. A projection optical system that projects from a first image plane on a reducing side to a second image plane on an enlargement side, comprising:
    a first optical system that includes a plurality of lenses and forms a first intermediate image formed inside the first optical system by light incident from the reducing side into a second intermediate image on the enlargement side of the first optical system;
    a second optical system that includes a first reflective surface with positive refractive power which is positioned further to the enlargement side than the second intermediate image; and
    a glass block that is disposed between the first optical system and the first reflective surface, the glass block passing rays from the first optical system to the second intermediate image;
    wherein the glass block is disposed between the first optical system and the second intermediate image.

10. A projector comprising:
    the projection optical system according to claim 9, and
    a light modulator that forms an image on the first image plane.

11. A projection optical system that projects from a first image plane on a reducing side to a second image plane on an enlargement side, comprising:
    a first optical system that includes a plurality of lenses and forms a first intermediate image formed inside the first optical system by light incident from the reducing side into a second intermediate image on the enlargement side of the first optical system;

a second optical system that includes a first reflective surface with positive refractive power which is positioned further to the enlargement side than the second intermediate image; and a glass block that is disposed between the first optical system and the first reflective surface, the glass block passing rays from the first optical system to the second intermediate image;

wherein the glass block includes:
an incident surface on a first optical system side;
an exit surface on a first reflective surface side; and
a side surface that is between the incident surface and the exit surface and is at least partially inclined with respect to an optical axis between the first optical system and the first reflective surface.

12. The projection optical system according to claim 11, wherein the side surface includes a surface that is inclined so as to be substantially parallel to lower rays of projecting light that reach the second image plane from the first reflective surface.

13. The projection optical system according to claim 11, wherein the side surface includes an internally reflective surface that reflects rays that reach the first reflective surface from the first optical system.

14. A projector comprising:
the projection optical system according to claim 11, and
a light modulator that forms an image on the first image plane.

15. A projection optical system that projects from a first image plane on a reducing side to a second image plane on an enlargement side, comprising:

a first optical system that includes a plurality of lenses and forms a first intermediate image formed inside the first optical system by light incident from the reducing side into a second intermediate image on the enlargement side of the first optical system;

a second optical system that includes a first reflective surface with positive refractive power which is positioned further to the enlargement side than the second intermediate image; and a glass block that is disposed between the first optical system and the first reflective surface, the glass block passing rays from the first optical system to the second intermediate image;

wherein a length GBL of the glass block along an optical axis between the first optical system and the first reflective surface and a length LML along the optical axis between the first optical system and the first reflective surface satisfy a following condition $0.1 < GBL/LML < 0.9$.

16. The projection optical system according to claim 15, wherein the length GBL of the glass block along an optical axis between the first optical system and the first reflective surface, the length LML along the optical axis between the first optical system and the first reflective surface, and a refractive index GBn of the glass block satisfy a following condition $0.05 < GBL/GBn/LML < 0.7$.

17. The projection optical system according to claim 15, wherein an Abbe number GBv of the glass block satisfies a following condition $30 < GBv < 100$.

18. A projector comprising:
the projection optical system according to claim 15, and
a light modulator that forms an image on the first image plane.

19. A projection optical system that projects from a first image plane on a reducing side to a second image plane on an enlargement side, comprising:

a first optical system that includes a plurality of lenses and forms a first intermediate image formed inside the first optical system by light incident from the reducing side into a second intermediate image on the enlargement side of the first optical system;

a second optical system that includes a first reflective surface with positive refractive power which is positioned further to the enlargement side than the second intermediate image; and a glass block that is disposed between the first optical system and the first reflective surface, the glass block passing rays from the first optical system to the second intermediate image;

wherein an optical path length OP1$d$ of upper rays of a light flux at an image height at an outermost periphery between the first optical system and the first reflective surface and an optical path length OP2$d$ of lower rays the light flux satisfy a following condition $1 < OP1d/OP2d < 1.15$.

20. A projector comprising:
the projection optical system according to claim 19, and
a light modulator that forms an image on the first image plane.

* * * * *